United States Patent
Butler

(10) Patent No.: US 7,028,192 B2
(45) Date of Patent: Apr. 11, 2006

(54) METHOD AND APPARATUS THAT ENABLE A COMPUTER USER TO VERIFY WHETHER THEY HAVE CORRECTLY INPUT THEIR PASSWORD INTO A COMPUTER

(75) Inventor: Richard M. Butler, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/703,946

(22) Filed: Nov. 6, 2003

(65) Prior Publication Data

US 2004/0098628 A1 May 20, 2004

Related U.S. Application Data

(63) Continuation of application No. 09/449,794, filed on Nov. 26, 1999, now Pat. No. 6,687,836.

(51) Int. Cl.
*H04K 1/00* (2006.01)
*H04L 9/00* (2006.01)

(52) U.S. Cl. ............... 713/183; 713/184; 713/168; 726/2

(58) Field of Classification Search ............ 713/189, 713/202, 183, 184, 185, 168; 726/2
See application file for complete search history.

(56) References Cited

U.S. PATENT DOCUMENTS

| | | | |
|---|---|---|---|
| 5,247,433 A | | 9/1993 | Kitaura et al. |
| 5,606,315 A | | 2/1997 | Gaskins |
| 5,617,526 A | | 4/1997 | Oran et al. |
| 5,887,131 A | | 3/1999 | Angelo |
| 6,026,491 A | * | 2/2000 | Hiles ................. 713/202 |
| 6,161,185 A | * | 12/2000 | Guthrie et al. ........ 713/201 |
| 6,212,525 B1 | * | 4/2001 | Guha .................. 707/101 |
| 6,766,454 B1 | * | 7/2004 | Riggins ............... 713/185 |

OTHER PUBLICATIONS

Microsoft Corporation, "The Windows Interface, An Application Design Guide", 1991; p. x (p. 10 Introduction), p. 4, p. 5, p. 41, p. 42, and p. 128.
Skiena, Steven S.; "The Algorithm Design Manual"; 1997, Telos Press, pp. 176-177.

* cited by examiner

*Primary Examiner*—Gilberto Barron, Jr.
*Assistant Examiner*—Samson Lemma

(57) ABSTRACT

Upon input of a password to a computer, the password is subjected to a hashing function to generate an N-bit number. The N-bit number is used as an index to retrieve at least one object from a list of objects. The retrieved objects are presented to a user, and the user is prompted to verify that the objects are recognizable as the objects which the user knows to be associated with their password. If the objects are verified as being recognizable, the password is accepted as a correct and intended input. Alternative embodiments of this method, and associated apparatus, are also disclosed.

19 Claims, 3 Drawing Sheets

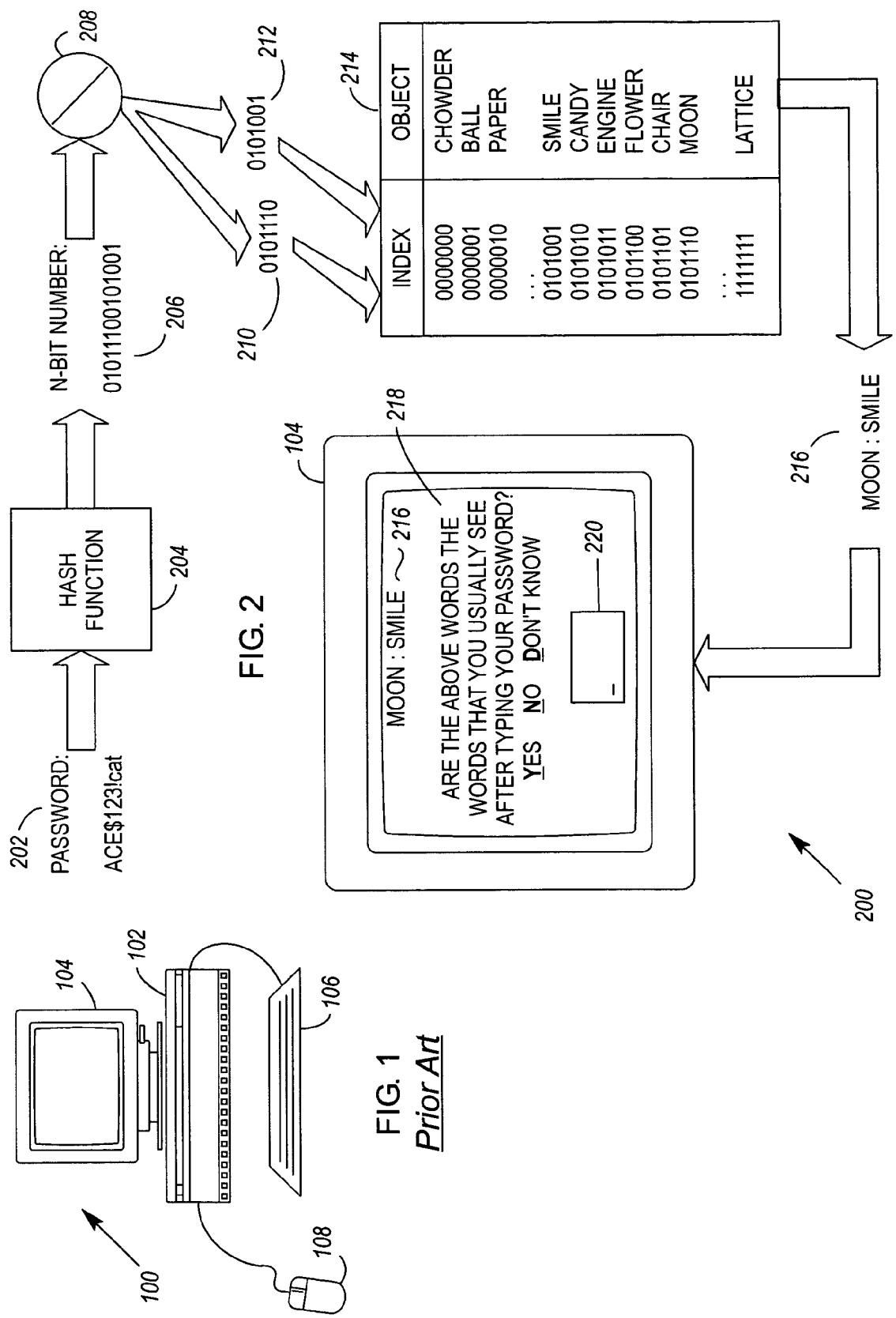

METHOD AND APPARATUS THAT ENABLE A COMPUTER USER TO VERIFY WHETHER THEY HAVE CORRECTLY INPUT THEIR PASSWORD INTO A COMPUTER

CROSS-REFERENCE TO RELATED APPLICATIONS

This is a continuation of copending application Ser. No. 09/449,794 filed on Nov. 26, 1999 now U.S. Pat. No. 6,687,836, which is hereby incorporated by reference herein.

FIELD OF THE INVENTION

The invention pertains to methods and apparatus which enable a computer user to verify whether they have correctly input their password into a computer. More specifically, the invention pertains to methods and apparatus which ensure that a password which a user inputs into a computer is the password which the user intended to input into the computer, and not a permutation thereof.

BACKGROUND OF THE INVENTION

When encrypting a file, a computer user is often asked to input a password. The password is used to generate an encryption key, and the key is then used to encrypt a file or files. To decrypt the file or files, the user, or someone to whom the user has disclosed their password, must re-input the user's password exactly as it was input during the file encryption process.

To increase the likelihood that an attacker will not be able to guess and/or reverse engineer a password, various constraints and latitudes can be associated with a password. An example of a constraint is that a password has to comprise at least eight characters. An example of a latitude is that a password can comprise not only any letter in the alphabet (upper or lower case), but also any number or special character which a user may input into a computer via the computer's attached keyboard.

A problem with user input passwords is that they are sometimes mistyped. When a user mistypes their password during file decryption, the penalty is not being able to open an encrypted file or files, and the fix is to retype the password correctly. The penalty is small, and the fix is simple. When a user mistypes their password during file encryption, the penalty is once again an inability to open the encrypted file or files. However, the fix is much more difficult since the number of ways in which a password can be mistyped is voluminous, and once a file has been encrypted with a mistyped password, one's knowledge of the intended password does not yield a simple fix, as it is the apropriately mistyped password which one needs to know.

In the simplest cases of mistyping, a user mistypes one or more letters of their password. For example, HOUSE might become HLUSE or HLESE. However, in more severe cases of mistyping, a user might misplace their hands on a keyboard. Thus, HOUSE might become JPIDR. Although this second form of mistyping occurs with less frequency, it does happen, and its effects can be catastrophic. If a user has no knowledge of their mistyped password, and no knowledge of a computer's means for generating an encryption key (which will most always be the case), then a file or files encrypted with a mistyped password can be forever lost.

The problem of encrypting a file with a mistyped password is compounded by the fact that many password entry prompts do not display a password as it is typed. Instead, a number of asterisks or other meaningless characters are displayed. While such placeholder characters prevent an onlooker from seeing a user's password, they further the likelihood that a user will encrypt a file with a mistyped password.

The most common solution to the problem of mistyped passwords is to force a user to type their password twice in succession. The successively typed passwords are then compared to ensure that they are identical. If there is any difference between the two passwords, the user is prompted to repeat the entire password entry procedure. While this solution discovers some mistyped passwords, it does have its disadvantages. For one, the necessity of having to type a password twice discourages some users from selecting the longer passwords which are typically necessary for strong encryption. Furthermore, repetitive typing of a password does not guarantee that all mistypings of a password will be discovered. For example, repetitive password typing will not detect problems such as having the caps lock on unintentionally, or having one's fingers shifted with respect to a keyboard.

Another solution to the problem of mistyped passwords is to have software generate a number of check characters that must be typed with a password. The check characters are a function of the rest of the characters in the password and may be generated, for example, by submitting the password as a whole to a hash function. Software can then verify whether the password and the check characters correspond. If they do, the password is accepted. If they do not, the password is rejected. While this solution provides greater protection against mistyped passwords than does the repetitive typing solution, it also tends to weaken encryption. Since a user is forced to remember their base password, as well as a seemingly random number of check characters, many users will shorten their base password so as to keep the total number of characters which need to be remembered to a manageable number (maybe 8–10). Thus, instead of typing in an 8–10 character password, a user might type in a less secure password of maybe 5–7 characters so that once the computer generates 3 or so check characters, the user need only remember a total of 8–10 characters. Unfortunately, the 8–10 characters which include check characters are not as strong from an encryption standpoint as 8–10 characters which are all independent from one another. The use of check characters to prevent mistyped passwords can therefore result in weaker encryption for some users. On the other hand, users who are more concerned about the strength of their password might continue to use longer base passwords, possibly taking advantage of the full number of characters allotted for a password (e.g., 20). However, if software receives a 20 character password, and then generates additional check characters, most users will be forced to write down their password. At a minimum, most users will be forced to write down the check characters. Although a 23 character password having a 20 character base password will provide as strong or stronger encryption than a 20 character base password standing alone, the fact that some or all of the 23 character password will need to be written down increases the likelihood that an attacker might discover the paper (or file) on which the password is recorded. Since most users rely on commercially available encryption/decryption software, once an attacker discovers a user's password or check characters, it is often a fairly easy task to reverse engineer the missing element(s) of the user's password. At a minimum, discovery of the check characters can reduce the number of trials which an attacker needs to make to "crack" an encrypted message.

A need therefore exists for a better method of insuring that a password input into a computer is the password which a user intended to input into the computer.

SUMMARY OF THE INVENTION

In achievement of the foregoing need, the inventor has devised a new form of password verification system.

Upon input of a password to a computer, the password is subjected to a hashing function to generate an N-bit number. The N-bit number is then used as an index to retrieve at least one object from a list of objects. The retrieved objects (which may consist of only a single object) are presented to a user, and the user is prompted to verify that the objects are recognizable as the objects which the user knows to be associated with their password. If the objects are verified as being recognizable, the password is accepted as a correct and intended input.

If the user has input a password for the first time, they will have no way of knowing whether the objects which are presented are the objects that correspond to their password. In this case, the user will need to indicate their uncertainty, and the system will prompt the user to re-input their password. If the user's re-input password is identical to their first input password, the system will accept the user's password, and the user will know that the objects which were presented to them are the ones which correspond to their password.

If a user knows that the presented objects are the ones that correspond to their password (i.e., the objects are the right ones), all the user needs to do is indicate to the system that they recognize the objects and their password will be accepted. Preferably, such an indication can be made by simply typing a "y" for YES, clicking on a YES button, or speaking YES into an audio transducer. As a result, if a user correctly types their password and then recognizes the objects that are presented to them as being the right ones, the only penalty which the user incurs is a single keystroke (i.e., typing "y" for YES), a single mouse click, or a single voiced response.

If a user knows which objects are supposed to be presented, but doesn't see (or hear) these objects in the verification prompt which is presented, the user can indicate to the system that they don't recognize the objects, and the user will be prompted to re-input their password.

With such a system, there is no need to remember check characters (or check words) which must be input from memory. Rather, a user need only be able to recall after prompting that objects are familiar. As a result, the user is free to input a long password which they find easy to remember, and there is no need to worry that their long password is going to be made even longer by a system which adds additional check characters to their password.

Furthermore, if a user recognizes presented objects as being correct, they need only make a single additional keystroke or other response to verify that their password was correctly input. Thus, a user does not need to re-input their entire password to verify the correctness of their password, and in a keyboard-based system, the user saves several keystrokes over verification methods which require a user to retype their password.

BRIEF DESCRIPTION OF THE DRAWINGS

An illustrative and presently preferred embodiment of the invention is illustrated in the drawings in which:

FIG. 1 illustrates a computer system into which a password might be input;

FIG. 2 illustrates a method which enables a computer user to verify whether they have correctly input their password into a computer;

DESCRIPTION OF THE PREFERRED EMBODIMENT

Figure 3:
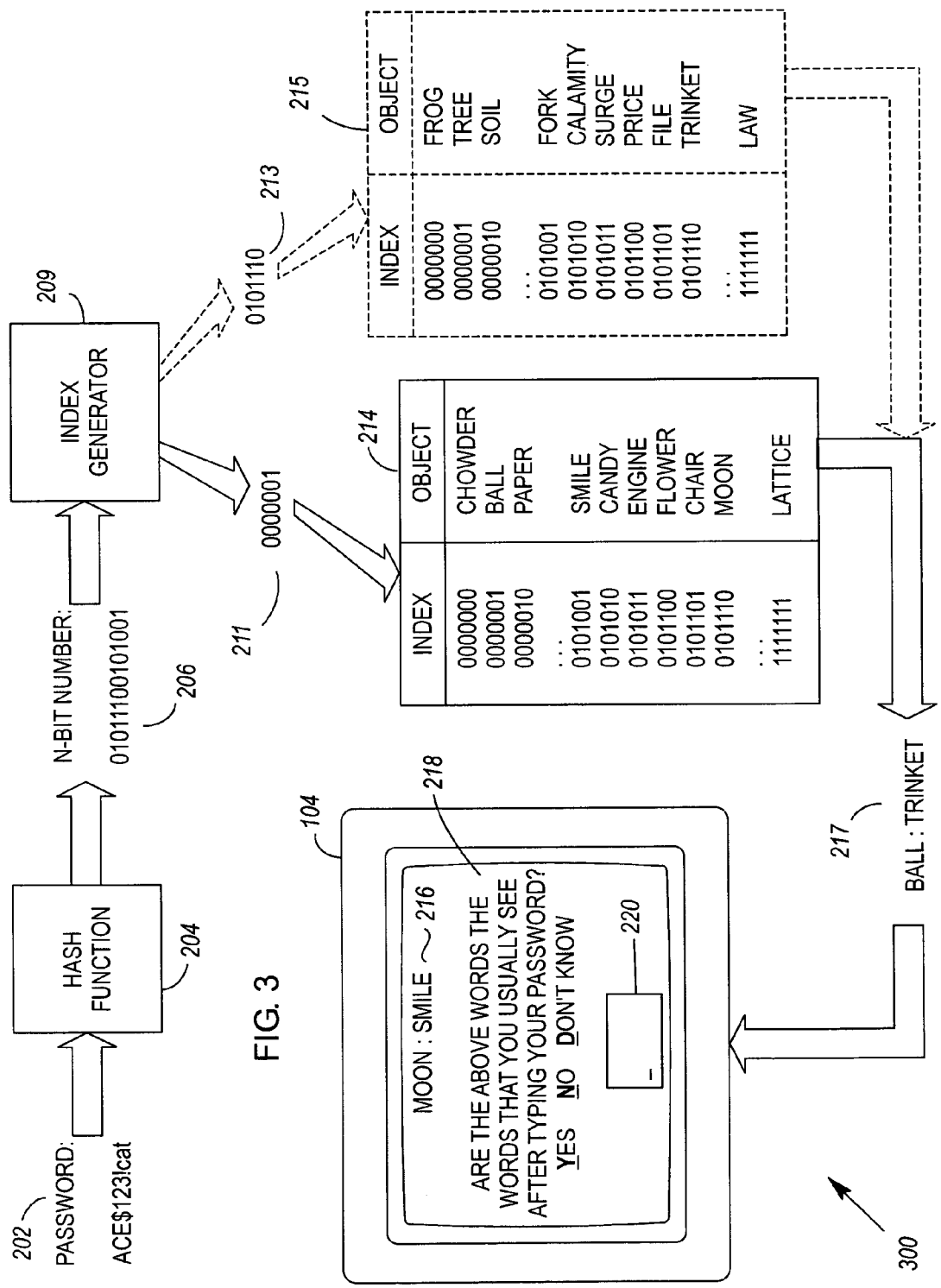
FIG. 3 illustrates an alternative method for enabling a computer user to verify whether they have correctly input their password into a computer.

A method 200 which enables a computer user to verify whether they have correctly input their password 202 into a computer 102 is illustrated in FIG. 2. The method 200 generally comprises the following steps. Upon input of the password 202, the password is subjected to a hashing function 204 to thereby generate an N-bit number 206. The N-bit number 206 is then utilized as an index 210, 212 for retrieving one or more objects 216 from an object list 214. The retrieved object(s) 216 are then presented to the user, and the user is prompted to verify that the retrieved object(s) 216 are recognizable as the object(s) 216 which the user knows to be associated with their password 202. If the retrieved object(s) 216 are verified as being recognizable, the password 202 is accepted as an intended input.

Having generally set forth the steps of the invention, the invention will now be explained in greater detail.

FIG. 1 illustrates a computer system 100 into which a password 202 might be input. The computer 100 comprises a processing unit 102, a monitor 104, a keyboard 106, and a mouse 108. The computer system 100 illustrated in FIG. 1 is exemplary only, and should not be interpreted as limiting the scope of the invention.

Figure 4:
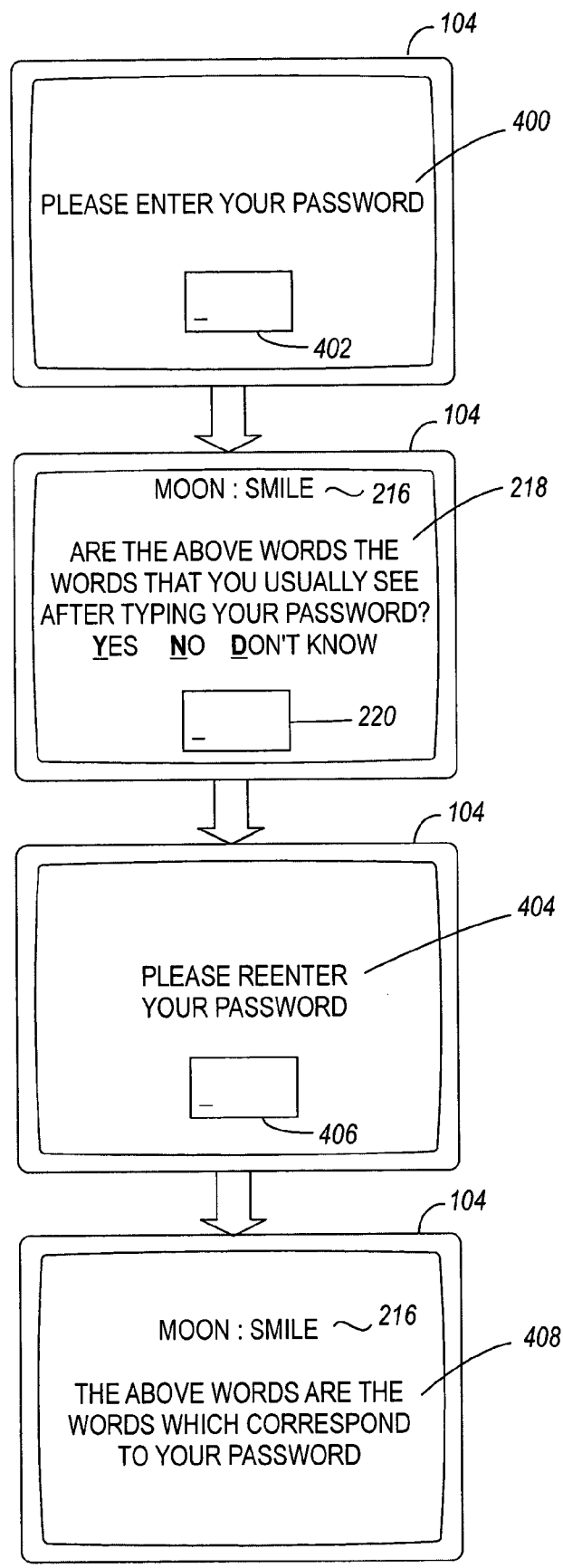
FIG. 4 illustrates a number of screen displays which a computer user might be presented with in conjunction with the methods illustrated in FIGS. 3 and 4.

From time to time, tasks performed by a user and/or a computer will trigger the presentation of a password entry prompt 400 (FIG. 4). A common task which triggers the presentation of such a prompt is file encryption. However, this is not the only task which will generate such a prompt. For example, a secure computer or network might request a password from a new user; an online purchase screen might request that a new customer input a password; a secure phone system, ATM, or other system having a microprocessor, stored program, and/or memory might request that a user input a password via the device's keypad, audio transducer, or some other input means; and software with a limited use license might attempt to self-police its distribution by asking for a password from its first user. In each of these instances, the user of a computer system 100 will be prompted to input a password 202 via the computer's attached keyboard 106 and/or mouse 108 (although pen tablets, trackballs, touch screens, audio transducers, and other input devices could also be used to input a password). Note that as used herein, the term "computer" is meant to cover any device with computing abilities, including, but not limited to: mainframe computers, workstations, personal computers, secure phones, secure faxes, automated teller machines (ATMs), calculators, hand-held organizers, pagers, and cell phones.

The password 202 which a user inputs in response to a password entry prompt 400 can typically comprise any character which is available to the user via a computer's attached keyboard 106. However, a password 202 will sometimes be constrained to letters only, numbers only, or alphanumeric characters only. Although not common, a password 202 might also comprise other and/or different types of input to a computer 100. For example, a user might use mouse 108 to select words, pictures or other objects displayed on screen 104, or a user might speak a password into an audio transducer. As it is used in this description, a password 202 is understood to mean any object input into a computer in response to a password entry prompt. An object is defined as any keyboard character, word, phrase, displayed word, displayed picture, spoken word, and so on that may be input into a computer and/or selected via computer input means (e.g., 106, 108), as part of a computer user's password 202.

Upon entry of a password 202 into the computer 100, a cryptographically strong hashing function 204 generates an N-bit number 206 that is dependent upon the password 202. The N-bit number is preferably a 14-bit number 206. The 14-bit number 206 is then split 208 into two groups of seven bits 210, 212, and each group of bits 210, 212 is used as an index for retrieving a word from a list of words 214. In the preferred embodiment, the list of words 214 is a fixed list of 128 words. The words 216 retrieved from the word list 214 (sometimes referred to herein as check words) are then presented to the user, and the user is asked to verify 218, 220 whether the two words 216 are those which the user knows to be associated with their password 202. Preferably, the user is able to respond to the verification prompt 218 by typing "y" for YES, "n" for NO, or anything else for DON'T KNOW 220. Other response formats could be used in the alternative. For example, YES, NO and DON'T KNOW push buttons, radio buttons, or the like could be presented to a user for appropriate mouse selection (or for selection by tabbing and entering, as is possible under operating systems such as Microsoft®'s Windows® 98). Note that if a user has spoken a password into a secure phone, the user might be presented with a verbal prompt in lieu of a displayed prompt. In this case, the user could speak YES, NO or DON'T KNOW into their phone and appropriate voice recognition software could process the user's response. Alternatively, the user could be prompted to press numbers corresponding to YES, NO, or DON'T KNOW on the phone's keypad.

The first time a user inputs a new password 202, they will have no way of knowing whether the check words 216 which are presented to them are the correct ones. It is also possible that a user might forget which check words 216 are associated with their password 202, or be unsure if the check words 216 which are presented are the right ones. In each of these cases, the user would respond to the verification prompt 218 with a DON'T KNOW response, thereby indicating to the system that they are unsure as to whether the presented check words 216 are the right ones. Upon receiving the DON'T KNOW input, the system (typically via an application program, operating system, or other process being executed on the computer) will prompt the user to re-input their password 202, 404 (FIG. 4). If the re-input password is identical to the first input password 202, the password 202 is accepted as being that which the user intended to input, and the system proceeds with file encryption. If the re-input and first input passwords differ in any way, both are discarded, and the user is prompted anew for a password 202, 400.

The above procedure for responding to a DON'T KNOW input is illustrative only, with various modifications to same being contemplated. For example, upon receiving a DON'T KNOW input, a system could simply discard the first input password 202 and present a user with another verification prompt following their reentry of their password 202. While such a modification ensures that an unencrypted password is held in memory for as short a time as possible, the modification places a greater burden on the user, as the user must independently verify their retyped password by once again acknowledging whether presented check words 216 are known by the user to be the ones which correspond to their password 202. In the embodiment of the invention disclosed in the previous paragraph, the system's self-comparison of the first and re-input passwords dispenses with the need to present a second verification prompt 218 to a user.

To ensure that a user remembers their password's corresponding check words 216, a system which is programmed to internally compare first and re-input passwords could briefly redisplay a user's check words 216, 408 after determining that the first and re-input passwords do in fact match. In this manner, a user who is initially unsure of their check words 216 is given a second chance to commit their check words 216 to memory.

Once a user has input their password 202, 402, re-input their password 406, and committed to memory the check words 216 which correspond to their password 202, their subsequent use of the same password 202 (e.g., to encrypt a second file) only requires a single entry of their password 202, 402, followed by a single keystroke (at 220) to indicate that the check words 216 which are displayed to them correspond to their password 202 (assuming, of course, that they have not mistyped their password 202).

In other words, when a verification prompt 218 is presented to a user, and the user recognizes the two words 216 which are being displayed as those which were displayed the last time they inputted the same password 202, the user need only type "y" for YES. In response to this affirmation, the system will accept their password 202 as being their intended input and will proceed with file encryption.

When a user types "y" in response to the verification prompt 218, which will usually be the case, they have incurred only a single keystroke penalty to ensure that they have correctly typed the password 202 which they intended to type. On the other hand, many currently available password mistyping prevention methods require that a user type their entire password 202 twice so that the two passwords can be compared. Since most passwords have a minimum length of eight characters, the current method represents at least a seven keystroke savings over mistyping prevention methods which require a user to retype their password 202 in its entirety.

Note that when a user inputs the same password 202 repeatedly, they only have to be able to recognize the check words 216 which correspond to their password 202. They do not need to independently recall their check words 216 from memory, but rather need only recognize them as being correct when they are displayed to them.

If the user does not recognize the check words 216 which are being displayed as those which were displayed the last time their password 202 was input, the user can respond to a verification prompt 218 by typing "n" for NO. In response to such an input, the system rejects and forgets the user's password 202 and prompts the user to re-input their password 202, 400. Upon reentry of their password 202, the user is again prompted with a password verification prompt 218. If the user now recognizes the check words 216 which are displayed, they can respond to the prompt by typing "y", and their files will be encrypted with the password 202 which they intended to use.

Regardless of how a user responds to a verification prompt 218, it is preferred that the system clear any check words 216 which are displayed on a computer screen 104 after approximately two seconds. Since knowledge of a user's check words 216 can significantly reduce the number of attempts which an attacker needs to make to establish the identity of a user's password 202, it is preferable to erase check words 216 from a computer's display as soon as a user is given enough time to read the check words 216. Since the words in a check word list 214 are ideally different sounding, different looking, and free from homonyms and plural tenses, check words 216 need only be displayed long enough for a user to read them. A user does not need to know how to spell them, should not have to distinguish between two or more similar looking words, and does not need to be able to independently recall the words 216 from memory. A user need only be able to recall the words 216 as being the ones which are associated with their password 202 (after being prompted with a display of same).

Two seconds is believed to be a reasonable time within which a user can read their check words 216, and within which a passerby or onlooker will have difficulty reading their check words 216. If an onlooker can read one's displayed check words 216 within two seconds, then the onlooker is probably close enough to the user to see at least some of the keys which the user presses while they are typing their password into the computer. Care should therefore be taken to ensure that an attacker cannot read one's keystrokes and/or displayed check words 216.

Another feature of the system which is believed to be useful is a response rejecter mechanism. The purpose of the response rejecter is to monitor the time between a computer's display of a verification prompt 218 (including its display of check words 216) and a user's input of a response to same. If a user responds to a verification prompt 218 faster than it is humanly possible to read and comprehend their check words 216 and input an informed response to the verification prompt 218, the user's response should be rejected. In this manner, a user is protected from their natural tendency of typing "y" or YES to quickly page through boilerplate screen splashes. Rather, a user is forced to read their check words 216, and rely on them to verify to the system that their password is correctly typed. If one is allowed to quickly page through a verification prompt 218, its usefulness can be circumvented. While a user who is encrypting their personal files may feel that they are too careful of a typer to mistype their password, accidents do happen, and if the file which the user is encrypting belongs to their company, their company will surely want to ensure that they have not encrypted an important company file in such a manner that its contents are forever lost. The feature disclosed in this paragraph is therefore an especially advantageous feature for system administrators and those in charge of computer usage policies who want to ensure that their computer users comply with encryption safeguards.

By using two 7-bit indexes 210, 212 and a word list 214 of 128 words, there is a one in 16,384 chance that a mis-typed password will generate the same two words 216 in the same order. There is a one in 8,192 chance that the same two words 216 will appear in any order. If more security against mistyping is required, a longer word list 214, as well as a hash function 204 which yields more and/or longer indexes 210, 212 into the word list 214, could be used. One could also bifurcate the word list 214, 215 (FIG. 3) so as to eliminate the possibility of mirror word groups appearing (e.g., ensure that if FROG:DUCK is a possible check word combination that DUCK: FROG is not a possible combination as well). FIG. 3 illustrates such a bifurcated word list 214, 215, and shows how the check words BALL: TRINKET 217, neither of which is duplicated in the two lists 214, 215, are retrieved from the two lists 214, 215.

FIG. 3 also illustrates a password verification method 300 which utilizes an index generator 209 to generate one or more indexes 211, 213 from the N-bit number 206 output by a hash function process 204. In comparison to the split 208 shown in FIG. 2, the index generator 209 can be configured in a variety of ways. For example, it could be configured to generate just one index 211, or a plurality of indexes 211, 213. It can also be configured to generate an index which is based on some permutation of the N-bit hash number 206 which is other than a mere split of the N-bit number.

Note that there are disadvantages to using a check word list 214 which is too long or too short. If the list 214 is too long, the number of passwords which map to a single pair of check words 216 will become small, and if an attacker should discover a user's check words 216, the number of passwords which he needs to try in order to decrypt a user's file may become small enough to make decryption easy. On the other hand, if a check word list 214 is too short, then too many passwords will map to the same pair of check words 216, and the odds become too great that a mistyped password will map to the same check words 216 to which a correctly typed password 202 maps.

Since the system disclosed herein does not add check characters to the password 202 which a user needs to recall from memory and type into the computer 100, the user should be able to input a longer and more secure password 202 which is easy for them to remember, but difficult for an attacker to guess. If a user's password 202 is easy to remember, the user should not have to write it down. Likewise, a user should not need to record the check words 216 which are displayed as part of the system's verification prompt 218. Since the system does not utilize the check words 216 as part of its encryption process, but only to ensure that a user has not mistyped their intended password, the system too has no need to keep a record of a user's check words 216, and should not do so.

Although the security of a system might be increased if the number and nature of the words in a check word list 214 are not known to an attacker, an attacker's knowledge of the contents of a check word list 214 is not particularly detrimental to encryption security. If a stored list of check words 214 comprises 128 words, a user's password 202 will map into one of 16,384 combinations of check words 216. However, not only must an attacker determine which combination of check words 216 maps into a user's password 202, but the attacker must then determine which one of possibly billions of passwords is the particular password 202 which mapped into the user's check words 216.

As has already been alluded to, the above described system presents several advantages over other password mistyping prevention methods. One advantage is that the absence of arbitrary check characters which a user must remember and type in addition to their base password enables a user to input a more lengthy password which is still easy to remember. However, as with all encryption methods, the system will still preferably enforce a minimum password length.

If the system functions as a standalone utility (e.g., an application which runs in conjunction with, but apart from, an encryption application), the system does not need to know whether a user's password 202 is a valid password for use by the underlying encryption application. The system's hash function 204 can therefore be designed to generate a hash number 206 and one or more indexes 210, 212 from any password 202 which is input into the system (whether the password 202 is numeric, alpha, alphanumeric, etc.). For example, the preferred embodiment of the system, described supra, will generate two check words 216 for any password 202 which is input into the system, regardless of character makeup or password length. When used with an encryption application which accepts passwords having numerous characters and long lengths, a multitude of passwords will therefore correspond to the same two check words 216. However, this is not believed to be problematic, as the use of two 7-bit indexes 210, 212 into a 128 check word list 214 still leaves only a one in 16,384 chance that two passwords will map to the same two check words 216. The probability of a user inputting two passwords in close succession, both of which map to the same two check words 216, is therefore remote.

For users who need to encrypt a lot of files, the number of additional keystrokes which they need to make for peace of mind against mistyped passwords is few. In fact, the number of additional keystrokes will usually only be one.

Another advantage of the system described herein is that even when a user mistypes their password, the two wrong check words (i.e., those that correspond to their mistyped password) can be used, along with their intended password, to determine how their password was mistyped. Although it was previously stated that potentially billions of passwords can map to a single pair of check words, a knowledge of the check words 216 and the user's intended password 202, in addition to facts such as the length of the user's password 202, the presence or absence of special characters, and other factors, can be used to quickly eliminate many of the passwords which theoretically "could" map into the known check words 216.

One more advantage of the above-described system is that it can assist a user in identifying "trojan horse" applications. A trojan horse application is one that appears to be Application X when it is in fact Application Y. Trojan horse applications are sometimes used by an attacker to discover the identity of a user's password. The trojan horse application gives the user the impression that they are using the application of their choice. However, in reality, the trojan horse application is merely conveying the user's password to an attacker. If the above-described password verification system is customized to work specifically with Application X, then trojan horse Application Y will need to simulate Application X in its entirety, and/or incorporate a password verification system which is identical to that used by Application X. If the attacker coding Application Y cannot ascertain the exact nature of the hash function, word list and so on used by the password verification system of Application X, then a user of trojan horse Application Y will not be presented with the check words which they know to be associated with their password. Note that in order to "beat" the trojan horse application, the user will need to make it a habit to first input a test password in response to any verification prompt which is presented to them. If the user knows the check words which correspond to their test password, but Application Y is not able to generate these check words, the user will know that Application Y is a trojan horse application, and the user can be sure not to input their real password in response to the trojan horse prompt of Application Y. If the user inputs their test password and is then presented with the check words which they are accustomed to seeing, they can see to it that Application X (the application they thought they were using) discards their test password, and they can then proceed to input their real password into Application X.

Although it is envisioned that the system disclosed herein will be implemented in software or firmware code, it is believed that a disclosure of such code is not necessary, as one skilled in the programming arts should be able to generate such code without undue experimentation given the disclosure of the invention found in this description.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method which enables a computer user to verify whether they have correctly input their password into a computer, comprising:
   upon input of the password, subjecting the password to a hashing function to thereby generate an N-bit number;
   utilizing the N-bit number as an index for retrieving at least one object from a list of objects;
   presenting the retrieved objects to the user and prompting the user to verify that the retrieved objects are recognizable as the objects which the user knows to be associated with their password; and
   if the retrieved objects are verified as being recognizable, accepting the password as the user's intended input.

2. A method as in claim 1, wherein the list of objects is a list of words.

3. A method as in claim 1, wherein the list of objects is a list of pictures.

4. A method as in claim 1, further comprising, if in response to the verification prompt the user indicates an uncertainty as to recognition of the retrieved objects, prompting the user to re-input their password.

5. A method as in claim 4, further comprising, if the re-input password matches the first input password, accepting the re-input password as the user's intended input.

6. A method as in claim 5, further comprising, if the re-input password matches the first input password, once again presenting the retrieved objects to the user and accepting the re-input password.

7. A method as in claim 1, wherein presenting the retrieved objects to the user comprises displaying the retrieved objects to the user.

8. A method as in claim 7, further comprising, if the retrieved objects are not verified as being recognizable within a predetermined amount of time, discontinuing the display of the retrieved objects and prompting the user to re-input their password.

9. A method as in claim 1, wherein presenting the retrieved objects to the user comprises audibly presenting the retrieved objects to the user.

10. A method as in claim 1, wherein prompting the user to verify that the retrieved objects are recognizable as the objects which the user knows to be associated with their password comprises prompting the user to make a single keystroke.

11. A method as in claim 1, wherein prompting the user to verify that the retrieved objects are recognizable as the objects which the user knows to be associated with their password comprises prompting the user to make a single mouse click.

12. A method as in claim 1, wherein prompting the user to verify that the retrieved objects are recognizable as the objects which the user knows to be associated with their password comprises prompting the user to utter a voiced response.

13. A method as in claim 1, further comprising, if the verification prompt is responded to in less than a predetermined amount of time, rejecting the response.

14. A method as in claim 1, further comprising, if the password is accepted, using the password to encrypt a file.

15. Apparatus which enables a computer user to verify whether they have correctly input their password into a computer, comprising:
- a number of computer readable media; and
- computer readable program code stored on the number of computer readable media, the computer readable program code comprising:
    - code for subjecting the password to a hash function to thereby generate an N-bit number;
    - code for maintaining a list of objects;
    - code that uses the N-bit number as an index for retrieving at least one object from the list of objects;
    - code for presenting the retrieved objects to the user and prompting the user to verify that the retrieved objects are recognizable as the objects which the user knows to be associated with their password; and
    - code that accepts the password as the user's intended input if the user's response to the verification prompt indicates that the user recognizes the retrieved objects as being the objects which the user knows to be associated with their password.

16. Apparatus as in claim 15, wherein the list of objects is a list of words.

17. Apparatus as in claim 15, further comprising code for prompting the user to re-input their password when the user's response to the verification prompt indicates that the user is uncertain as to whether the retrieved objects are recognizable.

18. Apparatus as in claim 17, further comprising code for accepting the re-input password as the user's intended input when the re-input password matches the first input password.

19. Apparatus as in claim 15, further comprising code to, upon acceptance of the password, use the password to encrypt a file.

* * * * *